April 24, 1928.
J. P. WOOD
PIVOT POLISHER
Filed Sept. 12, 1925
1,667,232
2 Sheets-Sheet 1
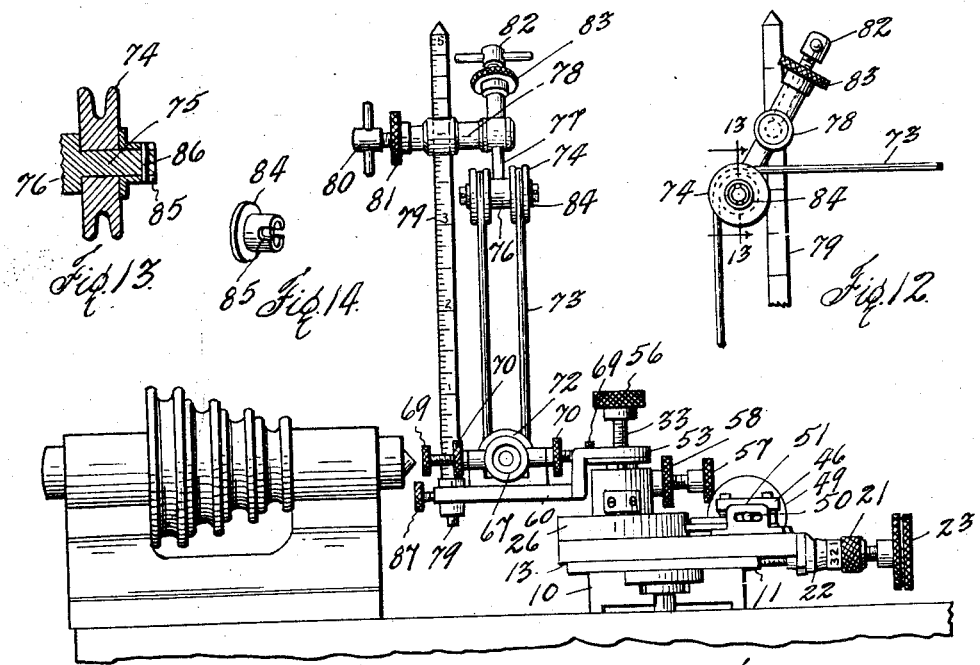
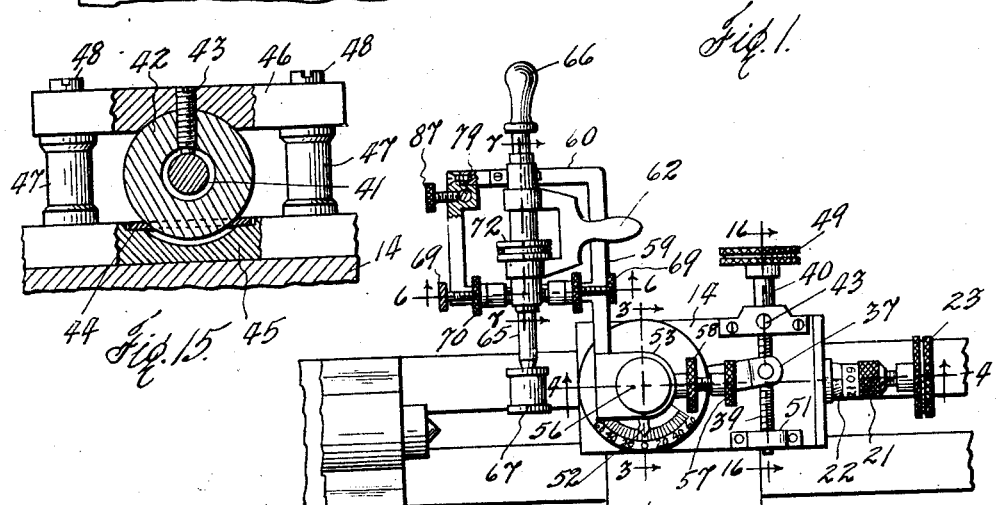
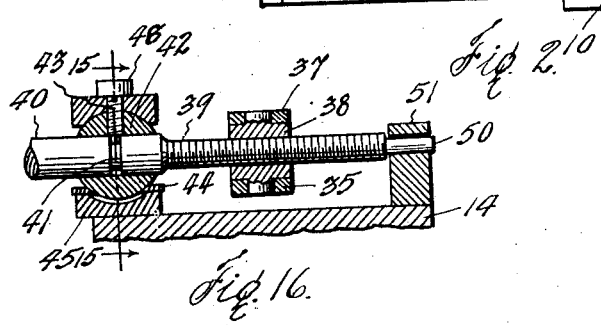
INVENTOR
J. P. Wood
BY
ATTORNEY April 24, 1928.
J. P. WOOD
PIVOT POLISHER
Filed Sept. 12, 1925
1,667,232
2 Sheets-Sheet 2
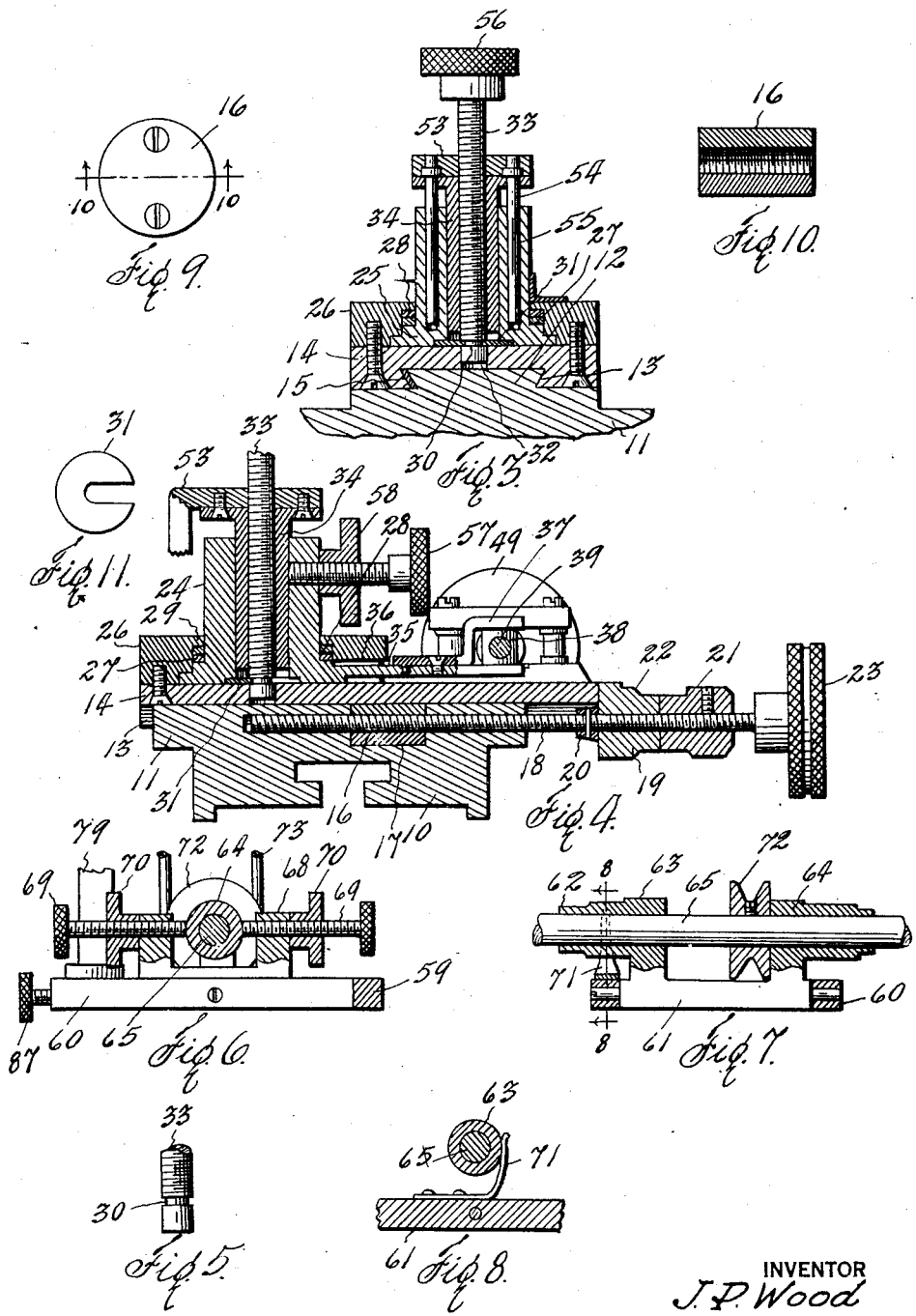
INVENTOR
J. P. Wood
BY
ATTORNEY Patented Apr. 24, 1928.

1,667,232

UNITED STATES PATENT OFFICE.

JAMES P. WOOD, OF BASTROP, TEXAS.

PIVOT POLISHER.

Application filed September 12, 1925. Serial No. 55,984.

This invention relates to new and useful improvements in pivot polishers.

The invention has particularly to do with that type of polisher which is used to grind and polish the pivots of balance staffs, spindles and pivots such as are used in watches, clocks and the like.

The object of the invention is to provide a polisher in which the support for the lapping or polishing attachment may be minutely adjusted laterally and also in which the attachment may be adjusted vertically on the support.

A further object is to provide a supporting post with an amplified base whereby rocking and vibration are substantially eliminated.

Another object is to make for ease and simplicity of adjustment but at the same time to provide for rigid fastening of adjustable parts.

A particular object of the invention is to provide great flexibility of adjustment whereby the lapping tool may be readily set at any desired angle with relation to the pivot being worked upon or adjusted above or below the longitudinal axis of the pivot or in the same plane therewith; and these adjustments made without stopping the operation of the polisher.

A further object of the invention is to provide a polisher which will be at all times under the control of the operator and one in which the cutting angle of the lapping tool may be varied while the work is in progress and without removing the vision from the tool, or pivot.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a partial side elevation of a jeweler's lathe equipped with a polisher constructed in accordance with my invention, Fig. 2 is a plan view of a portion of the same, Fig. 3 is an enlarged vertical sectional view taken on the line 3—3 of Fig. 2, Fig. 4 is an enlarged longitudinal sectional view on the line 4—4 of Fig. 2, Fig. 5 is a detail of the adjusting screw for the supporting post, Fig. 6 is an enlarged cross-sectional view on the line 6—6 of Fig. 2, Fig. 7 is an enlarged longitudinal sectional view on the line 7—7 of Fig. 2, Fig. 8 is a detail of the tension spring for the spindle rocker, Fig. 9 is a plan view of the screw button, Fig. 10 is a cross-sectional view on the line 10—10 of Fig. 9, Fig. 11 is a plan view of the lock washer for the post adjusting screw, Fig. 12 is a side view of the belt tightener, Fig. 13 is a sectional view on the line 13—13 of Fig. 12, Fig. 14 is a detail of one of the pulley retainers, Fig. 15 is an enlarged sectional view on the line 15—15 of Fig. 16, and Fig. 16 is an enlarged partial cross-sectional view on the line 16—16 of Fig. 2.

In the drawings the numeral 10 designates a slide table which has its underside suitably formed to engage the particular style of lathe on which it is to be used. Transversely of the table is an integral slide rest 11 having a central longitudinal dovetail 12 for engaging in the groove 13 in the underside of a slide 14. A liner 15 is also mounted longitudinally in said groove.

As is shown in Figs. 4 and 5 a threaded button 16 is confined in a sump 17 in the dovetail 12 and an adjusting screw 18 loosely mounted in said dovetail is rotatably confined in an apron 19 depending from one end of the slide 14. The screw is confined by a collar 20 fastened thereon and a calibrating sleeve 21 also fastened on the screw; said sleeve being suitably knurled and provided with graduations for registering with a mark on a boss 22 formed integral with the apron and through which the screw passes (Figs. 1, 2 and 4). A small hand wheel 23 is fastened on the outer end of the screw for turning the screw to adjust the slide longitudinally of the rest and also of the lathe. This provides for minute adjustment.

A very important feature is a supporting post 24 for the lapping attachment and means securing the various adjustment of said post as well as adjusting the attachment thereon. The post 24 is tubular (Figs. 3 and 4) and has a flat stepped annular base 25, the underface of which is flat and rests upon the slide. The base is rotatably confined by a retaining ring 26 recessed to overhang the lower step. A flat washer 27 is placed on the upper step of the base and receives a bowed tension washer 28 which is confined by an overhanging flange 29 formed on the ring and snugly surrounding the post. By this arrangement the base 25 is at all times held in contact with the slide 14 and all play is taken up.

Concentrically within the bore of the post is mounted a vertically adjusting screw 33 which is threaded and has a groove 30 (Fig. 5) around its lower end for receiving a keeper 31 (Fig. 11). The screw is centered in the bore of the post by engaging in an opening 32 (Figs. 3 and 4) in the slide 14, while the keeper rests upon the slide to support the post and is rotatably confined by the ring 26. The bore of the post receives tubular shank 34 of the lapping attachment which is threaded to receive the screw 33.

For rotatably adjusting the post an arm 35 formed integral with the base 25 extends through an arcuate slot 36 (Fig. 4) in the ring 26 and has fastened thereon a bracket 37 which overhangs the end of the arm. Between the bracket and the end of the arm is pivoted a nut 38 (Figs. 4 and 16). A transverse screw 39 is threaded through the nut. The screw has a cylindrical shank 40 at one end provided with a circumferential groove 41 (Fig. 16) and is rotatably confined in a pivot collar 42 by a set screw 43. The collar is ball-shaped and rests upon a resilient washer 44 on a step 45 (Figs. 15 and 16). A retaining bar 46 is dished to receive the ball collar and is confined upon posts 47 by screws 48. The screw 43 is threaded through the bar and engages in the groove 41.

It will be seen that the screw is free to rotate and may be swung in a horizontal plane, but it cannot move longitudinally. A hand wheel 49 is fastened on the outer end of the screw for rotating the same (Fig. 2). The opposite end of the screw has a reduced spindle 50 which is free to swing laterally in a slotted keeper 51 (Fig. 16) mounted on the base. The retaining ring 26 is provided on its upper surface with a concentric scale graduated from a central zero point and co-acting with a pointer 52 mounted on the post 24 (Figs. 1 and 2). It is apparent that when the screw 39 is rotated the nut 38 will travel thereon and swing the arm 35, whereby the post 24 will be rotated. The screw has fine threads and owing to the length of the arm 35, a very minute adjustment of the post and tool 67 may be obtained.

The lapping attachment is an important part of the device. The tubular shank 34 has fixed to its upper end a right angular bracket 53 from which a pair of pilot pins 54 depend. These pins engage in wells 55 in the post and prevent the shank and bracket from rotating, but permit a free vertical movement. The screw 33 has a turning button 56 on its upper end. For fastening the shank in adjusted positions I provide a set screw 57 threaded through the post 24 to engage the shank and a jamb nut 58 for locking the screw.

A horizontal arm 59 extends from the bracket 53 at right angles thereto and its outer portion forms one side of a rectangular frame 60. Between the frame members and parallel to the arm a rocker 61 is pivoted. The rocker has a yoke handle 62 overhanging said arm. The rocker (Fig. 7) is U-shaped and has a sleeve bearing 63 at its rear end and a sleeve bearing 64 at its front end. A spindle 65 rotatable in the sleeve is free to slide longitudinally. A handle (Fig. 2) is confined on the rear end of the spindle. The forward end of the spindle is reduced so that a lapping tool 67 may be frictionally engaged thereon.

The front sleeve 64 is disposed between standards 68 fixed on the frame 60 and rocks between stop screws 69 (Fig. 6) threaded through said standards. Jamb nuts 70 are mounted on the screws for holding them in adjusted positions. A curved tension spring 71 (Figs. 6, 7 and 8) is fastened on the frame and engages the rear sleeve 63. This spring will act to swing the rocker and hold the sleeve 63 in contact with one of the screws 69. The swing of the rocker is limited by the spacing of the screws and when the handle 62 is depressed and released the spring will swing the rocker to its normal position.

On the shaft 65 a small pulley 72 is fastened and is driven by an endless belt 73 one end of which passes around said pulley. This belt passes over a pair of idler pulleys 74 and is driven from the usual counter shaft (not shown). The pulleys 74 are mounted on trunnions 75 (Figs. 1, 12 and 13) projecting from each side of a hub 76 carried by a hanger 77 which is centrally pivoted on a bracket 78. The bracket is slidably mounted on a square vertical staff 79. The bracket has a horizontal set screw 80 threaded therein and engaging the staff and carrying a jamb nut 81. The staff is graduated and the bracket is fastened at sufficient elevations by the parts 80 and 81. The hanger has a longitudinal set screw 82 and a jamb locking nut 83, whereby the hanger and pulleys 74 may be adjusted in a vertical plane and fastened. In order to confine the pulleys 74 on the trunnions 75 I employ flanged collars 84 (Fig. 14) slotted at 85 to receive a pin 86 passing through (Fig. 13) the trunnion.

As is shown in Fig. 2 the lapping attachment is mounted so that the tool 67 is in position to act on the pivot which the latter is set up in the lathe parallel to the face of the tool 67 when the pointer 52 registers with zero on the scale. To adjust the lapping tool to the proper angle, the hand wheel 49 is turned after the slide 14 has been adjusted by turning the wheel 23. The turning of the wheel 49 rotates the screw 39 which moves the nut 38 and swings the arm 35. This rotates the post 24 and swings the tool 67 to the proper angle. To vertically adjust the lapping tool below, above or parallel to the longitudinal axis of the pivot, the screw 57 is first loosened and the screw 33 is then turned by the button 56 to vertically adjust the frame 60, after which the screw 57 is tightened to fasten the shank 34 against further movement.

The staff 79 is swiveled in the frame 60 and fastened by a screw 87. When the tool 67 and its spindle 65 are swung on an angle so that the belt 73 might be thrown off the pulleys 74, said screw 87 is loosened and the staff turned so that the pulleys 74 are alined with the counter shaft.

It is obvious that necessary adjustments may be readily made and the lapping tool set at the correct angle. The rocker 61 enables the face of the lapping tool to be moved across the revolving surface of the pivot which is being ground or polished.

Various changes in the size and shape of the different parts, as well as modifications and alterations may be made within the scope of the appended claims.

What I claim, is:

1. In a pivot polisher, a supporting slide, a vertical tubular post having an enlarged base rotatably confined on the slide, the post having an axial bore, a bracket for supporting a pivot polisher and having a cylindrical shank disposed within said axial bore, a vertical adjusting screw threaded into said shank and extending axially of the bore of the post and rotatably confined therein against vertical movement, and means for rotatably adjusting the post.

2. In a pivot polisher, a support, a vertical tubular post rotatably mounted thereon and having an axial bore, a tool supporting bracket having a cylindrical shank disposed within said bore, a screw retained in said bore against axial movement and having a threaded connection with said shank to effect vertical adjustment thereof, means connecting the shank and post to prevent relative rotary movement thereof, and means for rotatably adjusting the post.

3. In a pivot polisher, a support, a vertical tubular post rotatably mounted thereon, a tool supporting bracket having a cylindrical shank disposed within said post, a screw rotatably retained in said support against axial movement and having a threaded connection with said shank to effect vertical adjustment thereof, means connecting the shank and post to prevent relative rotary movement thereof, a radial adjusting arm on said post and a screw mounted upon the support and connected to said arm for rotative adjustment of the post.

4. In a pivot polisher, a support, a vertical tubular post rotatably mounted thereon and having an axial bore, a tool supporting bracket having a cylindrical shank disposed within said bore, a screw rotatably retained in said support against axial movement and having a threaded connection with said shank to effect vertical adjustment thereof, and a pin and socket connection between said bracket and post to prevent relative rotary movement thereof, and means for rotatably adjusting the post.

5. In a pivot polisher, a support, a vertical tubular post mounted thereon and having an axial bore, a tool supporting bracket having a cylindrical interiorly threaded shank disposed within said bore, a screw threaded through said shank and rotatably retained at the base of the bore against axial movement, and means slidably connecting the bracket and post to allow relative longitudinal movement thereof but to prevent rotative movement thereof during the vertical adjustment of the shank by said screw.

In testimony whereof I affix my signature.

JAMES P. WOOD.